United States Patent
Riordan, III et al.

(10) Patent No.: US 7,055,865 B2
(45) Date of Patent: Jun. 6, 2006

(54) LATERAL CONNECTION SYSTEM

(75) Inventors: John Emmett Riordan, III, Lynchburg, VA (US); Sean Brian Routon, Madison Heights, VA (US)

(73) Assignee: The Harrington Corporation, Lynchburg, VA (US)

( * ) Notice: Subject to any disclaimer, the term of this patent is extended or adjusted under 35 U.S.C. 154(b) by 0 days.

(21) Appl. No.: 10/690,718

(22) Filed: Oct. 23, 2003

(65) Prior Publication Data

US 2005/0087982 A1   Apr. 28, 2005

(51) Int. Cl.
*F16L 41/00*   (2006.01)
(52) U.S. Cl. .............. 285/133.21; 285/133.11; 285/133.3; 285/133.4; 285/5; 285/355
(58) Field of Classification Search ........... 285/133.11, 285/133.21, 133.3, 133.4, 5, 355, 356, 357
See application file for complete search history.

(56) References Cited

U.S. PATENT DOCUMENTS

| | | | | |
|---|---|---|---|---|
| 2,399,275 A | * | 4/1946 | Wenk ...................... 285/133.4 |
| 3,408,098 A | * | 10/1968 | Wilson ...................... 285/247 |
| 4,537,426 A | * | 8/1985 | Carter, Sr. ................. 285/110 |
| 4,600,219 A | * | 7/1986 | Yoshida et al. .............. 285/55 |
| 4,946,204 A | * | 8/1990 | Boticki ...................... 285/281 |
| 5,108,134 A | * | 4/1992 | Irwin ....................... 285/133.3 |
| 5,330,237 A | * | 7/1994 | Suzuki et al. ............... 285/281 |
| 5,464,257 A | * | 11/1995 | Riddles et al. ......... 285/133.21 |
| 5,582,439 A | * | 12/1996 | Spears ........................ 285/333 |
| 5,681,058 A | * | 10/1997 | Hwang .................... 285/133.4 |
| 5,848,813 A | * | 12/1998 | Albrecht .................... 285/332 |
| 6,578,876 B1 | * | 6/2003 | Guertin, Jr. ............ 285/148.19 |

* cited by examiner

*Primary Examiner*—James M. Hewitt
(74) *Attorney, Agent, or Firm*—Nixon & Vanderhye P.C.

(57) ABSTRACT

A service tee forming part of a main fluid line has a laterally extending female fitting with threads and a gasket spaced axially from the distal end of the threads. A male fitting having a series of male threads and a cylindrical extension terminating in the distal end of the male fitting is threadedly coupled to the female fitting. The threads are non-tapered and cylindrical. A mechanical connection between the male and female fittings is provided by the engagement of the threads, while the seal is formed between the gasket and the extension, thereby enabling orientation about the common axes of the fittings relative to one another for a full 360°.

7 Claims, 5 Drawing Sheets

LATERAL CONNECTION SYSTEM

BACKGROUND OF THE INVENTION

The present invention relates to apparatus for connecting fittings used in the conveyance of fluids, for example, irrigation systems, and particularly relates to male and female fittings having a threaded connection and a seal therebetween facilitating free angular orientation of the fittings to one another while maintaining the seal.

In many fluid flow systems, for example, underground irrigation systems, a large fluid supply pipe is provided with a service tee. The service tee is provided with a fitting which feeds a lateral line for flowing fluid to an exit port, e.g., a nozzle, or a sprinkler head. Typically, the male and female fittings between the service tee and the lateral line utilize a machined tapered pipe thread. Generally, the male fitting has threads which taper down to a smaller diameter at the distal end of the male fitting. The female threads likewise are tapered into general conformance with the male threads.

In tapered pipe threads of this type, the threads per se provide both sealing and structural connections between the fittings. However, these fittings are very difficult and costly to machine and require high precision to match the threads. Tapered threads of this type are also difficult and time-consuming to assemble in the field and require the use of lubricating and seal-enhancing tape and paste. Moreover, both functions of sealing and connecting the fittings to one another is difficult to achieve where the predetermined orientation of the pipes to which the fittings are connected is required. For example, if the lateral connection from the service tee is to extend at right angles to the service tee, i.e., normal to the direction of flow through the tee, the tapered threads must both seal and connect in order to locate the lateral connection in that orientation. If the threads are not properly oriented relative to one another, the fitting may require rotation beyond the orientation point to force the threads into the desired orientation. Conversely, threading short of the full threaded extent of the threads and leaving the threads loose to achieve the predetermined orientation may result in substantial leakage through the threaded joint. That is, in order to first achieve a seal and then orientation, very high torques may be required to rotate the fitting to the necessary orientation. It is possible that the additional rotation required may not be available due to this very high torque or the lack of remaining threads. Accordingly, there is a need for a connection system which affords connections between male and female fittings in a manner to provide the physical connection between the fittings, as well as the seal, without regard to the rotational orientation of the fittings.

BRIEF DESCRIPTION OF THE INVENTION

In accordance with a preferred embodiment of the present invention, there is provided male and female fittings for a connection system wherein the functions of sealing and connection are separated from one another. Particularly, a female fitting is provided, preferably on a service tee, although the female fittings and other devices conveying fluids may be provided on other types of pipes and on lateral lines. The female fitting has non-tapered straight cylindrical threads that are preferably cast to final form rather than machined. The female fitting preferably also includes an annular gasket spaced from the threads and having a radially inwardly facing sealing surface. Alternatively, the gasket could reside in the male fitting and engage a sealing surface in the female fitting. The male fitting has complementary straight cylindrical threads for threaded engagement with the female threads. The male fitting also includes a cylindrical extension spaced axially from the male threads.

Preferably, the gasket in the female fitting is located on a side of the threads remote from the opening to the female fitting. Thus, upon threading engagement of the male fitting onto the female threads, the cylindrical extension extends into the female fitting to engage the radial inward facing sealing surface of the gasket prior to the completion of the threaded connection between the male and female fittings. As a consequence, the orientation of the male and female threads about their relative rotational axes is freely adjustable for the full 360°, while maintaining the seal. That is, the engagement of the threads with one another maintains the physical connection securing the male and female fittings to one another while the engagement of the cylindrical section and gasket ensures the sealing function for all rotatable orientations of the fittings relative to one another.

Further, by employing a long baseline between the initial thread and gasket of the female fitting, as well as the support of the female threads offered laterally to the mating male fitting, the joint has high stability and stiffness. Further, the assembly of the fittings to one another requires only the application of common pipe lube in threading the fittings to one another. Once the male and female fittings are fully threaded to one another, the male or female fitting may be rotated in an opposite direction into a predetermined orientation. Because the cylindrical section on the male fitting remains in engagement with the gasket of the female fitting during relative rotation into the desired orientation, the seal remains effective.

In a preferred embodiment according to the present invention, there is provided a connection system comprising first and second pipes for flowing a fluid, one of the first and second pipes having a female fitting in fluid communication with the one pipe, the fitting having straight, non-tapered female threads, another of the first and second pipes having a male fitting in fluid communication with another pipe, the male fitting having an external thread and a cylindrical section extending from the external thread, the male fitting being receivable in the female fitting with the male and female threads engageable with one another to connect the fittings to one another, a cylindrical gasket between the male and female fittings and spaced from the male and female threads upon connecting the fittings to one another, the male cylindrical section and the female fitting engaging the gasket when the fittings are connected to one another to seal the fittings to one another thereby to establish fluid communication therebetween.

DETAILED DESCRIPTION OF THE INVENTION

Figure 1:
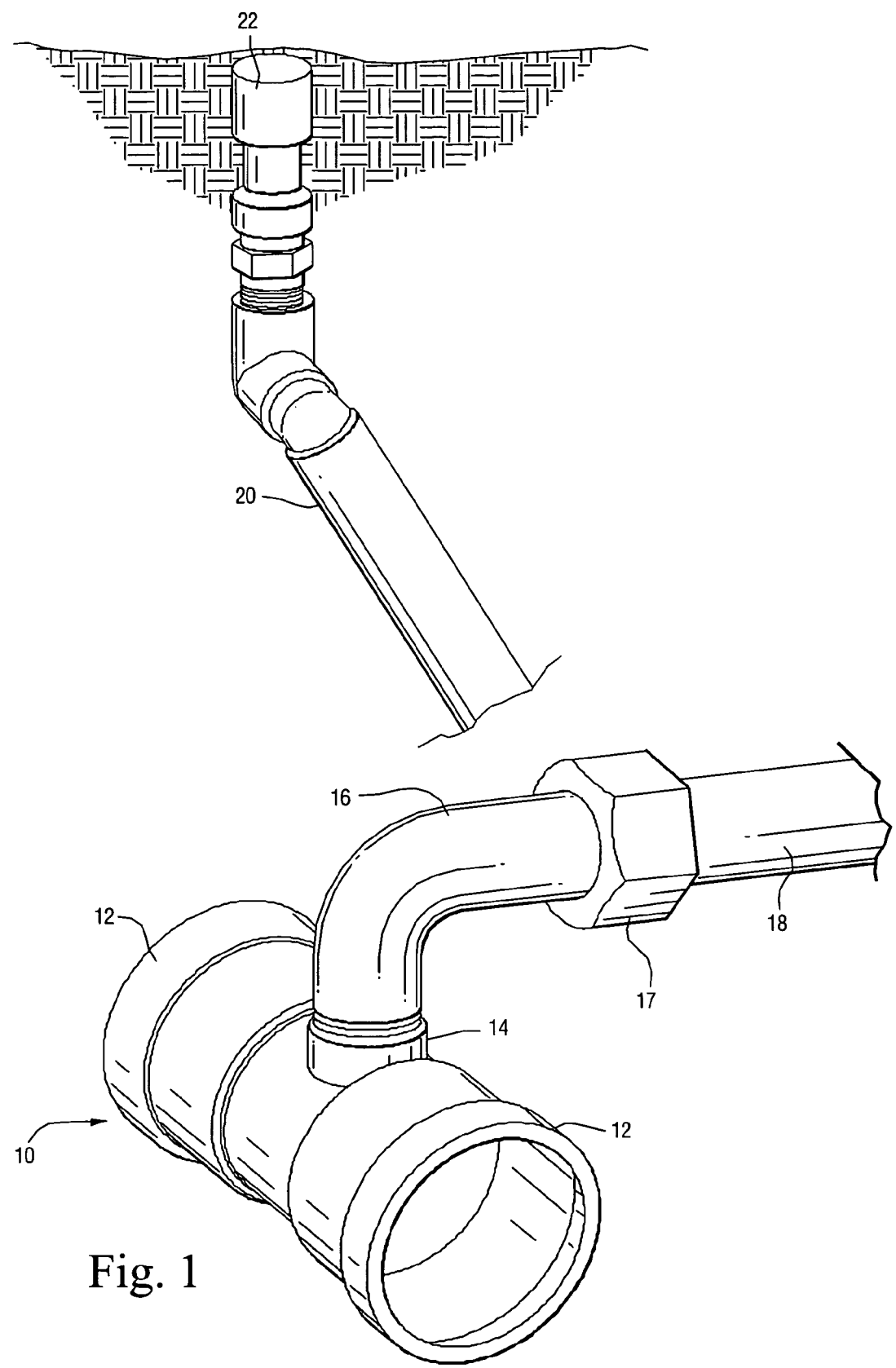
FIG. 1 is a fragmentary perspective view with parts broken out of a connection system in accordance with a preferred embodiment of the present invention.

Referring now to the drawings, particularly to FIG. 1, there is illustrated a service tee, generally designated 10, which is typically connected to a main fluid line such as a large water-carrying irrigation pipe, not shown. The service tee 10 includes couplings 12 at opposite ends for connection with the main fluid pipe. The service tee 10 also includes a fitting 14 for coupling the main fluid line to one or more lateral lines for distribution of the fluid, e.g., water. For example, the fitting 14 comprises a female fitting for connection to a male fitting 16 (FIG. 3) which may form part of a lateral distribution line. The opposite end of the fitting 16 terminates in a connection 17, e.g., a threaded connection, for coupling with one or more lateral lines as desirable or necessary. Thus, as illustrated, connection 17 may connect with a lateral line 18 and one or more lateral lines 20 which terminate, for example, in below-ground irrigation nozzles 22.

Figure 2:
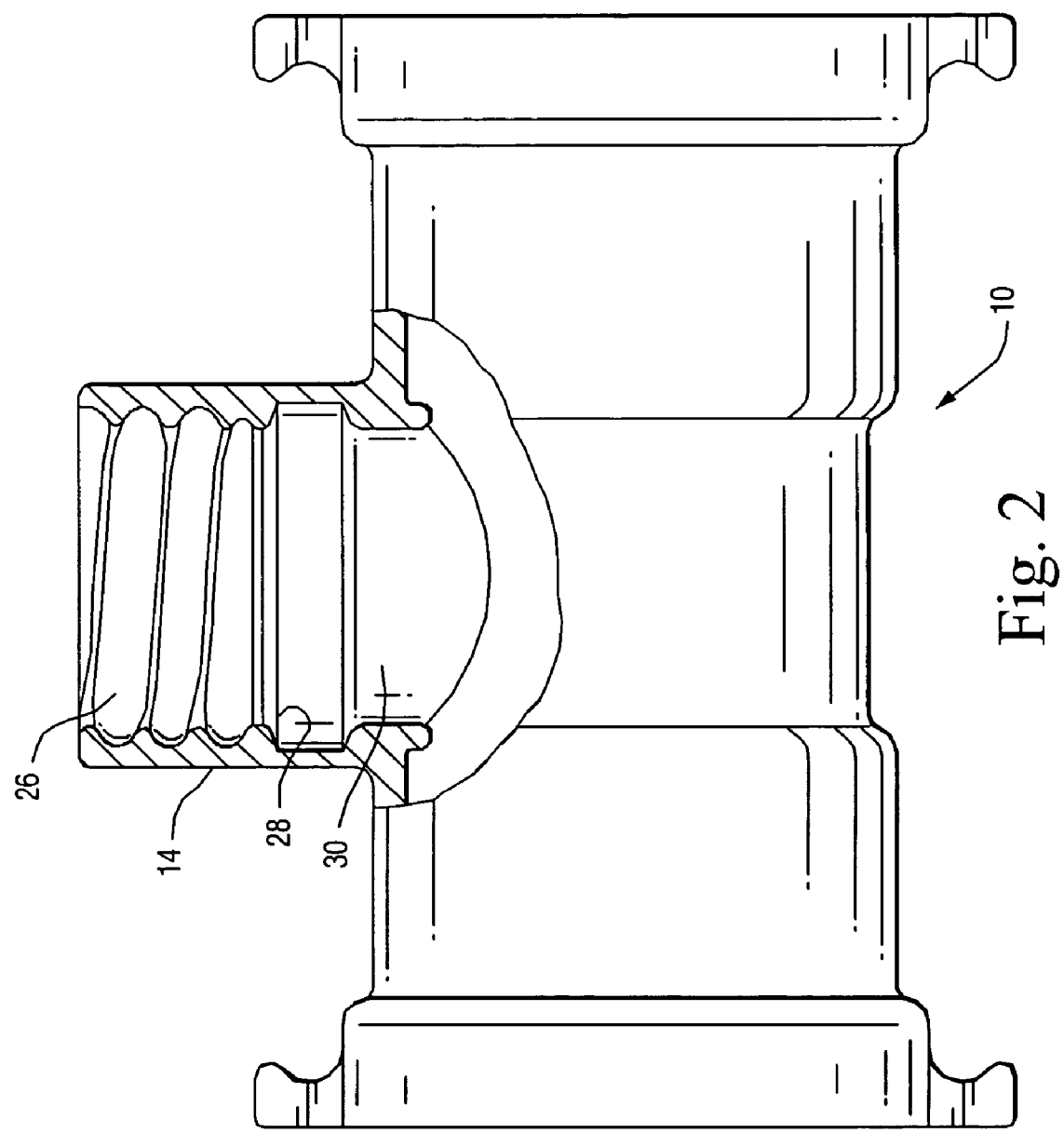
FIG. 2 is an enlarged side elevational view of a service tee with parts broken out and in cross-section illustrating the female fitting.
Figure 4:
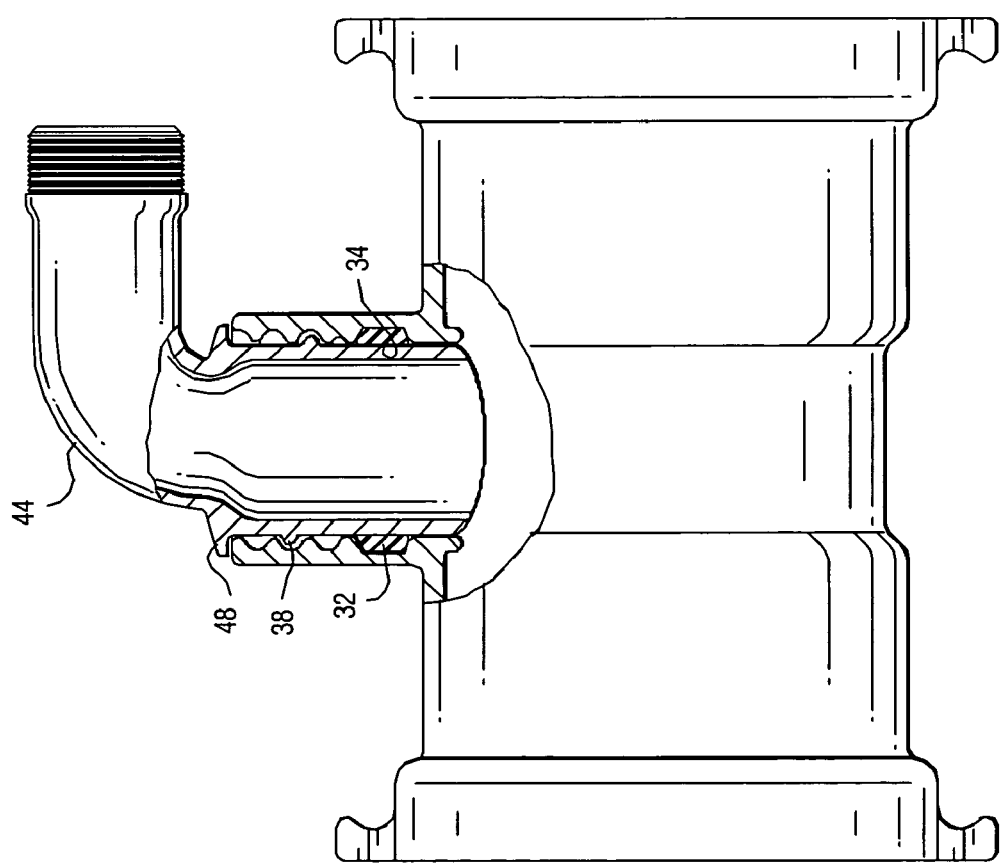
FIG. 4 is a view similar to FIG. 2 illustrating the connection between the male and female fittings.

Referring now to FIG. 2, the service tee 10 is formed of an integral cast material. The lateral fitting 14 is preferably a female fitting, although it will be appreciated that the female and male fittings 14 and 16 may be reversed, i.e., the male fitting provided on the service tee and the female fitting on the lateral connection. In the illustrated form, however, the female fitting 14 includes non-tapered straight cylindrical threads 26 commencing at the outer end of the cylindrical fitting 14 and terminating at their inner ends in an annular recess 28 adjacent the outlet opening 30 of the service tee 10. As illustrated in FIG. 4, the female fitting 14 preferably also includes an annular gasket 32 received in the recess 28. Gasket 32 includes an annular inner surface 34 for sealing engagement with the male fitting as described below. Conversely, the male fitting may have the annular gasket and female fitting have a sealing surface.

Figure 3:
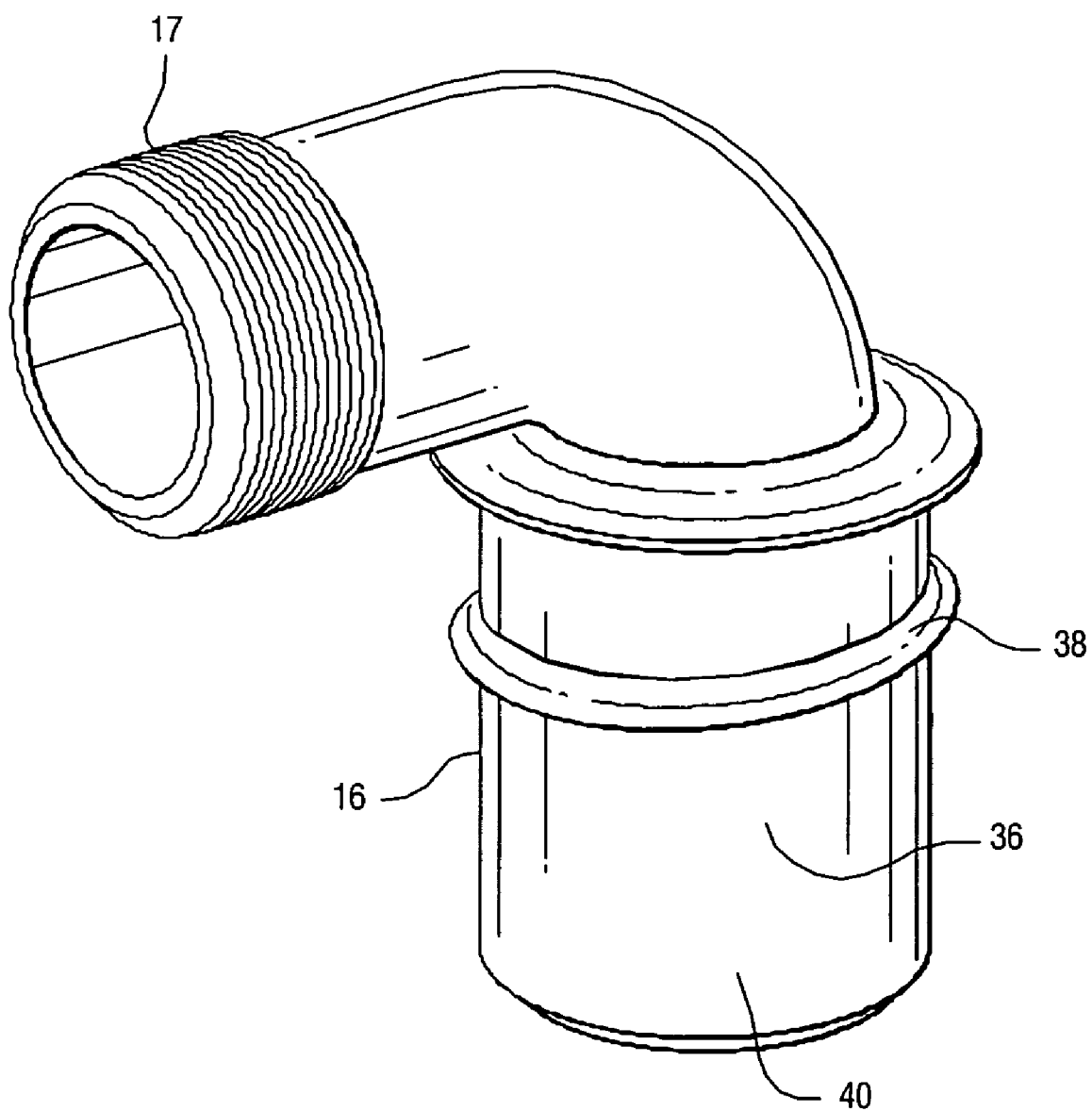
FIG. 3 is an enlarged perspective view of a male fitting for cooperation with the female fitting of the service tee.

Referring to FIG. 3, the male fitting 16 includes a cylindrical section 36 carrying a plurality of cylindrical male threads 38. Male fitting 16 also includes a cylindrical extension 40 spaced axially from the male threads 38 and terminating at the inner end of the male fitting. As best illustrated in FIG. 4, the gasket 32, preferably formed of rubber, is located axially inwardly of the female threads 26, i.e., remote from the opening of the female fitting receiving the male fitting. From a review of the drawing figures, it will be appreciated that the male threads 38 are located an axial distance from the male fitting opening at least equal to an axial distance between the gasket 32 and the first of the female threads adjacent the female fitting opening. In this manner, the cylindrical extension 40 of the male fitting seals with the sealing surface 34 of gasket 32 upon initial threading engagement of the male and female threads with one another. As a consequence of this arrangement, the fittings are rotatable relative to one another about their common axes into any angular orientation while the seal between the fittings is maintained. That is, the engagement of the male and female threads with one another maintains the physical connection securing the male and female fittings to one another, while the engagement of the cylindrical extension 40 and the gasket 32 ensures the sealing function for all rotatable orientations of the fittings relative to one another. Thus, with the service tee in-ground and, for example, the female fitting projecting upwardly from the service tee the male fitting with its elbow 44 may be oriented at any angular orientation for the full 360° while maintaining the secured connection with the tee.

Referring to FIG. 4, the male fitting 16 also includes an annular radially outwardly directed projection 48. As illustrated in FIG. 4, the projection 48 overlies the open end of the female fitting, protecting it in service from entry of soil, fluid or other contaminants. The fitting 16 may comprise a valve.

Figure 5:
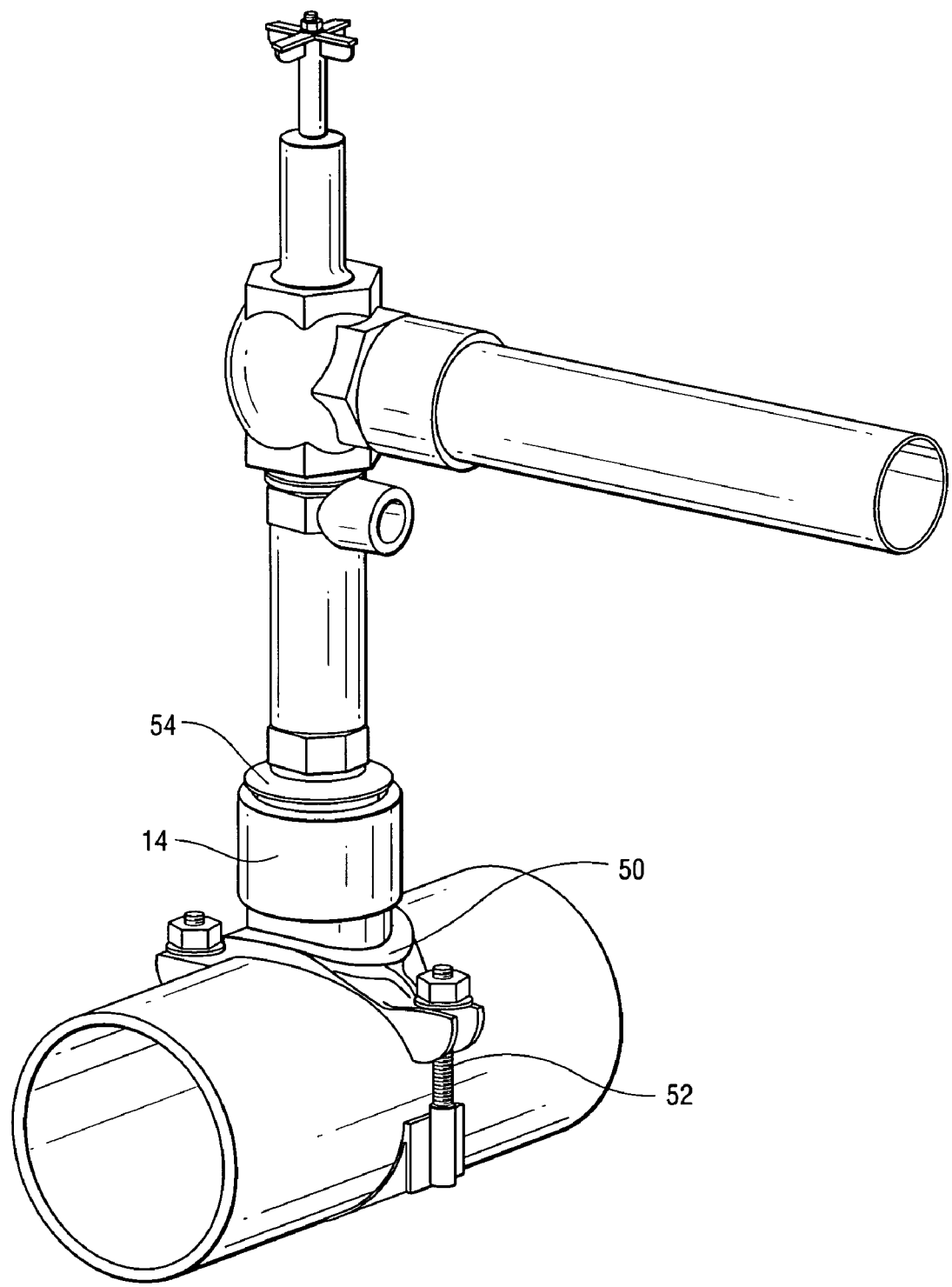
FIG. 5 is a perspective view of a similar connection system using a saddle connection with a main fluid line.

Referring to FIG. 5, the lateral fitting 14 may comprise a part of a saddle 50 secured by bolts 52 to the main fluid line. The fitting 14 has preferably the same internal configuration as illustrated in FIG. 4 with respect to the threads 26 and the gasket 32 and, as such, receives a male fitting 54 having the same cylindrical configuration 36 and male threads 38 as illustrated in FIG. 3. Of course, the male fitting 54 forms part of a straight pipe in FIG. 3, rather than an end of an elbow as in FIG. 4.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An irrigation connection system comprising:
   first and second pipes for flowing a fluid;
   one of said first and second pipes having a female fitting in fluid communication with the one pipe, said fitting having straight, non tapered female threads;
   the other of said first and second pipes having a male fitting in fluid communication with said other pipe, said male fitting having an external straight, non-tapered thread and a cylindrical section spaced axially from said external thread;
   said male fitting being receivable in the female fitting with the male and female threads engageable with one another to connect the fittings to one another;
   a cylindrical gasket between said male and female fittings and spaced axially from the male and female threads upon connecting the fittings to one another;
   the male cylindrical section and the female fitting engaging said gasket when the fittings are connected to one another to seal the fittings to one another thereby to establish fluid communication between the first and second pipes;
   said female fitting having an opening adjacent one end for receiving the male fitting, the gasket being located on the female fitting on a side of the female threads remote from the opening;
   said male fitting having an opening on one end for communicating the fluid between the first and second pipes, the male thread being located on the male fitting an axial distance from the male fitting opening at least equal to an axial distance between the gasket and a first of the female threads adjacent the female fitting opening thereby enabling the cylindrical section of the male fitting to seal within said gasket of the female fitting upon initial threading engagement of the male and female threads with one another.

2. A system according to claim 1, wherein said fittings, when connected to one another by said threads, are rotatable relative to one another while maintaining the gasket in sealing relation between the male and female fitting.

3. A system according to claim 1, wherein said fittings are formed of a cast metal material.

4. A system according to claim 1, including a stop carried by said male fitting precluding full threading of the male fitting into the female fitting.

5. A system according to claim 1, wherein said one pipe includes a main fluid flow line, said other pipe including a lateral line in connection with said main fluid flow line and having an elbow terminating in said male fitting, said female fitting projecting from the main flow line, said male fitting being received in said female fitting with said lateral line in a predetermined angular orientation relative to said main flow line.

6. A system according to claim 5 wherein the gasket is located in the female fitting on a side of the female threads remote from the opening.

7. A system according to claim 1 wherein said female fitting comprises a saddle secured to and in communication with said one pipe.

* * * * *